US008764899B2

(12) United States Patent
Oien et al.

(10) Patent No.: US 8,764,899 B2
(45) Date of Patent: Jul. 1, 2014

(54) COATING FOR AND METHOD OF TESTING LANDSCAPING MATERIAL

(75) Inventors: Larry G. Oien, Ogden, IA (US); Rebecca Lister, Ames, IA (US)

(73) Assignee: BASF Corporation, Florham Park, NJ (US)

( * ) Notice: Subject to any disclaimer, the term of this patent is extended or adjusted under 35 U.S.C. 154(b) by 880 days.

(21) Appl. No.: 12/401,752

(22) Filed: Mar. 11, 2009

(65) Prior Publication Data

US 2010/0229461 A1  Sep. 16, 2010

(51) Int. Cl.
*C09D 5/00* (2006.01)
*C09D 183/04* (2006.01)
*C09D 183/06* (2006.01)
*C09D 183/10* (2006.01)

(52) U.S. Cl.
CPC ............... *C09D 5/00* (2013.01); *C09D 183/04* (2013.01); *C09D 183/06* (2013.01); *C09D 183/10* (2013.01)
USPC .................................. 106/287.1; 106/287.14

(58) Field of Classification Search
USPC .......................................... 106/287.1, 287.14
See application file for complete search history.

(56) References Cited

U.S. PATENT DOCUMENTS

| 3,653,955 A * | 4/1972 | Habib ............................ 427/214 |
| 4,067,140 A | 1/1978 | Thomas ............................... 47/9 |
| 4,932,156 A | 6/1990 | Underwood ........................ 47/9 |
| 5,105,577 A | 4/1992 | Hedges ............................... 47/9 |
| 5,308,653 A | 5/1994 | Rondy .......................... 427/212 |
| 5,866,201 A | 2/1999 | Blue .............................. 427/212 |
| 6,162,496 A | 12/2000 | Blue .............................. 427/212 |
| 6,517,232 B1 | 2/2003 | Blue .............................. 366/297 |
| 6,536,939 B1 | 3/2003 | Blue .............................. 366/297 |
| 6,551,401 B1 | 4/2003 | Winistorfer et al. .......... 118/303 |
| 6,815,411 B2 * | 11/2004 | Trinh et al. ................... 510/515 |
| 7,465,699 B2 * | 12/2008 | Trinh et al. ................... 510/466 |
| 2004/0265706 A1 * | 12/2004 | Montgomery et al. ........... 430/5 |
| 2009/0030162 A1 | 1/2009 | Mueh et al. |

FOREIGN PATENT DOCUMENTS

DE  10 2004 049 427   4/2006

OTHER PUBLICATIONS

Dow Corning FF-400 MSDS (2011).*
The DOW Chemical Company, Technical Data Sheet, DOW Dipropylene Glycol, Regular Grade, pp. 1-2, Jul. 2003.

* cited by examiner

*Primary Examiner* — David M Brunsman
(74) *Attorney, Agent, or Firm* — Flaster/Greenberg, P.C.

(57) ABSTRACT

A coating is provided for a landscaping material, comprising a hybrid network of high functionality structured oligomeric siloxane and a polyalkylene glycol coupled with a co-product of monopropylene glycol and propylene oxide. The coating may be coupled with a pigmented colorant and be further mixed with a water-based carrier. The coating is contemplated to increase the efficiency of the mulch as compared to plain mulch material and other coating materials. A testing apparatus, including a retention basin and water measuring basin, are also defined as a means to determine the efficiency of the mulch material and its corresponding coating.

16 Claims, 4 Drawing Sheets

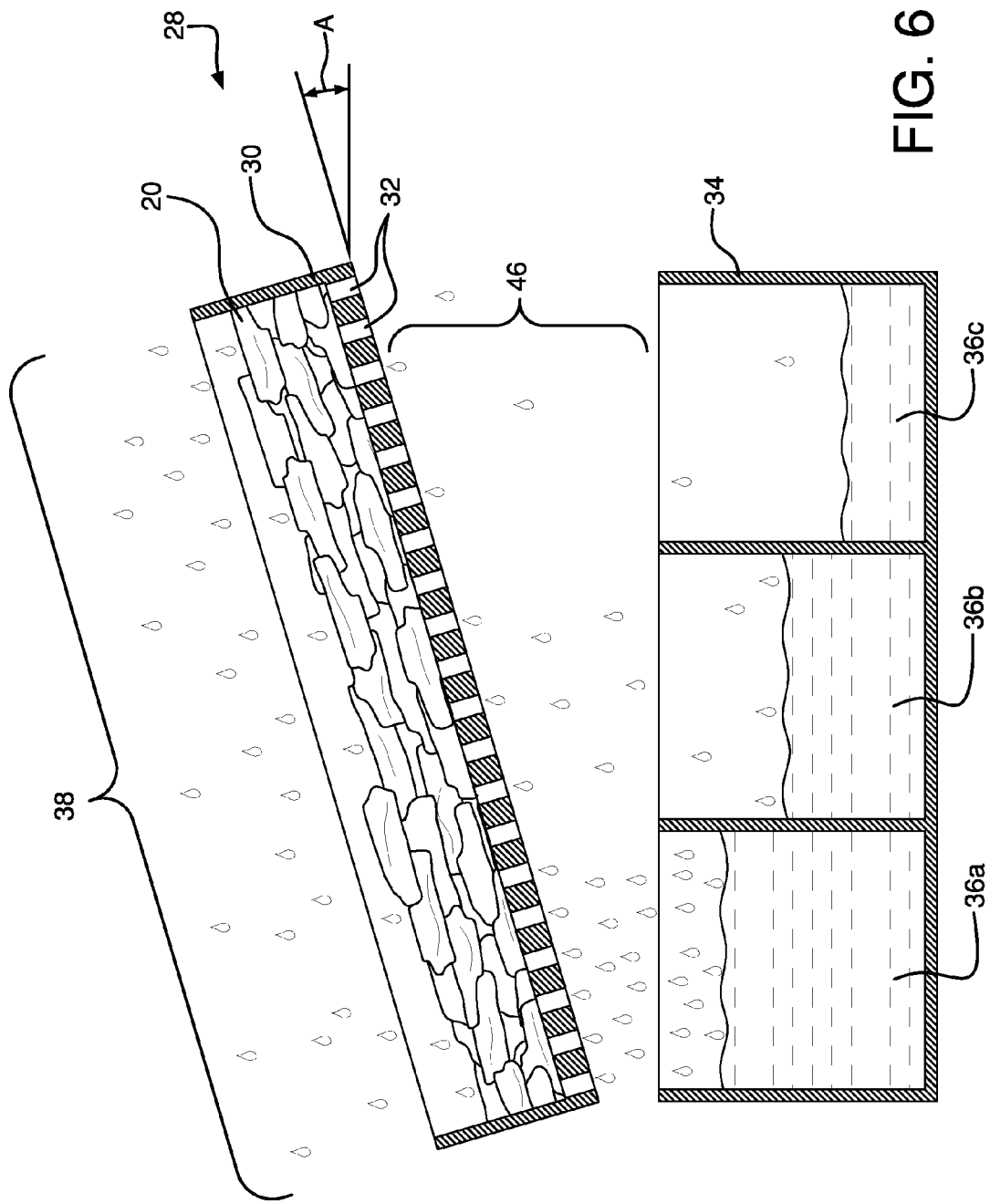

COATING FOR AND METHOD OF TESTING LANDSCAPING MATERIAL

FIELD OF THE INVENTION

The present invention relates to a coating for a landscaping material, such as fibrous mulch, and a method of testing the effectiveness of landscaping material.

BACKGROUND TO THE INVENTION

Landscaping materials, such as mulch, are placed over a soil surface around trees and plants. Mulch is intended to improve soil conditions by retaining moisture within the soil, minimizing weed competition and distributing water to the soil. Mulch can also provide landscapes with a well-groomed appearance.

Mulch may be comprised of a plurality of fragments, such as chips, shredded bark, shells, etc. The fragments may be made from grinding, chopping, or otherwise reducing bulk material into the desired form. Two major types of landscaping mulch are inorganic and organic. Inorganic mulches include various types of stone, lava rock, pulverized rubber, geotextile fabrics and other materials. Inorganic mulch does not decompose and does not need to be replenished often. Because this type of mulch, does not decompose, it does not significantly improve soil structure, add organic materials or provide nutrients. Organic mulch is usually derived from plants and may include wood chips, pine needles, bark, cacao hulls, leaves, compost mixtures and a variety of other products. Organic mulches decompose in the landscape at different rates depending on the material and climate.

The marketability of mulch, particularly for decorative landscaping purposes, often depends on the appearance of the product and its color. Coloring agents or coatings have been used to artificially color landscaping material for a number of years. The coloring agents allow for greater control and uniformity in the appearance. The coloring agents are commonly sold in concentrated form and are mixed with water prior to their introduction to the landscaping material. The colorants used as part of the coating may also include admixers, such as resins and surfactants. U.S. Pat. No. 4,932,156 to Underwood describes a method for controlling the color of mulch that may become faded due to prolonged exposure to light and ambient weather conditions. The Underwood patent describes a composition generally comprised of a pigment or dye, a binding additive, glycol and water. This Underwood patent is herein incorporated by reference.

A number of machines exist for adding colorants to landscaping material. U.S. Pat. No. 6,551,401 to Winistorfer et al. describes a machine for coloring landscaping material having multiple mixing chambers. A first mixing chamber includes spraying of the coating material onto the mulch material and a second chamber wherein the coating is further applied in the form of an aerosol. Paddles supported by arms are secured to a rotating shaft within the mixing chambers to mix the landscaping material during the coating process. This patent is herein incorporated by reference.

Mulch provides many functions. To most effectively perform these functions, the mulch preferably provides a fairly uniform moisture level throughout the mulch bed. In addition, mulch should direct water evenly into the root system of the adjacent trees and plants, preventing the water from running off. For a few reasons, conventional organic mulch often does not create uniform moisture levels nor efficiently distribute water evenly over the soil bed.

The difference in the surface energy of organic mulch and water typically causes the water to "bead-up" or form droplets on the surface of the mulch material. Where the surface energy of a liquid is greater than the substrate on which the liquid is applied, the liquid is likely to bead-up on the surface of the substrate. Conversely, where the surface energy of the substrate is greater than the surface energy of the applied liquid, the liquid is more likely to "wet" or coat the surface of the substrate. Similarly, as the surface energies of the substrate and liquid align appropriately, the liquid begins to more uniformly and effectively wet the substrate. "Wetting" refers to a liquid forming a film-like coating with a substantially uniform thickness over the substrate rather than beading up or forming droplets. Wetting may also refer to a condition wherein droplets are more spread out or less spherical. In other words, the droplet has a contact angle, or angle at which a liquid interface meets the substrate's surface that is less steep and therefore forms a shallow profile on the surface of the substrate.

When the water beads-up on the surface of a substrate, the droplets coagulate on a portion of the surface, accumulate and then run-off. The run-off forms channels of water that move through a path of least resistance. In mulch materials, the path of least resistance is typically a path created by gaps in the landscaping material. Another path of least resistance is over the surface of the mulch material. Water that does not move through the gaps in the mulch material simply runs-off the surface of the bed, without being directed into the mulch bed or to the underlying soil bed. The random paths and surface run-off results in an uneven application of water to the soil, soaking certain areas and leaving large dry spots in other areas.

The surface energy of organic materials, such as wood chips, is generally much less than that of water. For example, the surface energy of oak chips without a colorant is roughly 35 dyne/cm at 25 degrees Celsius. The surface energy of water is roughly 72 dyne/cm at 25 degrees Celsius. Based on this differential between the surface energy, water will bead-up on the surface of the oak chips rather than wet the surface. In addition, organic landscaping material comprised of naturally-occurring substances has an irregular or non-uniform composition. Thus, some mulch chips in a batch may have different surface energies and different portions of individual chips may also have variations in surface energy. This also contributes to the uneven flow of water.

SUMMARY OF THE INVENTION

One aspect of the present invention is a coating for landscaping materials, such as organic mulch. The coating includes the combination of a hybrid of high functionality structured oligomeric siloxane and a polyalkylene glycol. Preferably, the combination is coupled with a solvent in the form of a co-product of monopropylene glycol and propylene oxide. This coating forms a concentrate that may be mixed with water or some other carrier and may further be included with a colorant material. The coating is contemplated to increase the surface energy of the landscaping material, thereby bringing it closer to the surface energy of water. Increasing the surface energy of the landscaping material promotes wetting of the surface of the coated landscaping material. The wetted material is capable of controlling the release of the water into the covered soil bed. Thus, the landscaping having the contemplated coating promotes uniform flow of applied water to the soil bed.

The effectiveness of a landscaping material can be tested in conditions similar to its normal use to determine its ability to retain water and to control the distribution of water applied to its upper surface. The test may be performed to compare treated and untreated landscaping materials as well as to compare different coating compositions. In one aspect of the invention, the testing apparatus includes a first receptacle having a plurality of compartments and a second receptacle for retaining a quantity of mulch material. The first receptacle is positioned under the second receptacle. One test using the testing apparatus includes the application of liquid (water) onto the landscaping material retained in the second receptacle. The liquid added is measured and categorized according to the amount and time required to saturate the landscaping material and the relative amount of liquid passing through the landscaping material and directed into each compartment of the first receptacle is compared along with the time it takes for the water to enter the compartments to evaluate wetting efficiency and water flow direction.

BRIEF DESCRIPTION OF THE DRAWINGS

For the purpose of illustrating the invention, the drawings show forms that are presently preferred. However, it should be understood that the invention is not limited to the precise arrangements and instrumentality shown in the drawings.

FIG. 6 is a cross-sectional view of the testing apparatus of FIG. 5.

DETAILED DESCRIPTION

Figure 1:
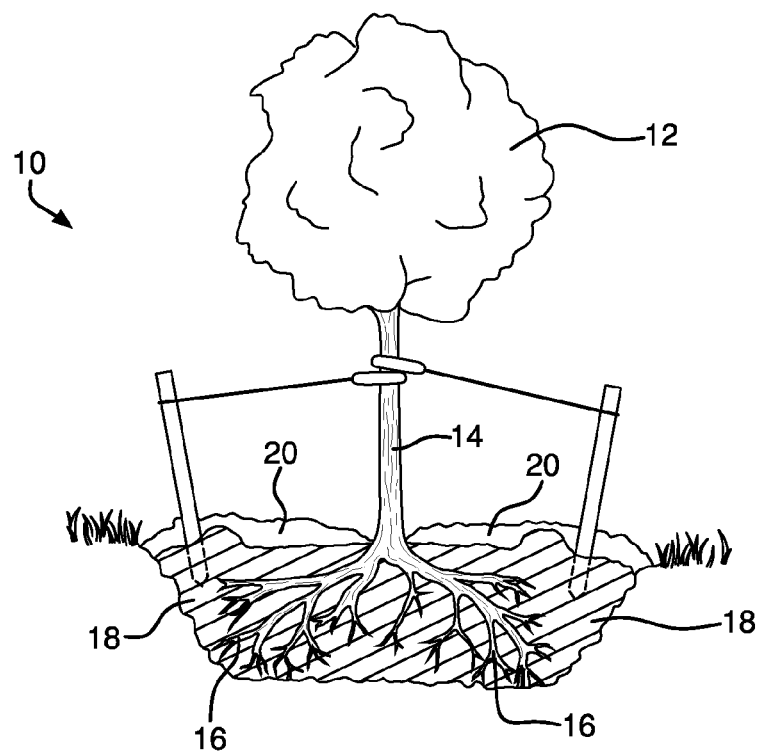
FIG. 1 is a partial cross-sectional view of a landscaping system with a tree planted in the ground and a landscaping material coating thereon.

Referring now to the drawings, wherein like numerals identify like elements, there is shown in FIGS. 1-4 various representations of a landscaping system using a mulch for covering the soil surrounding a plant or tree. As used herein, "landscaping material" refers to any organic or inorganic, natural or synthetic material used to cover, preserve, maintain, restore or otherwise treat the ground or soil. Preferably, the landscaping material is a mulch comprised of a plurality of units or fragments of a natural or organic material, such as wood chips, pellets, granules, scraps or an aggregate thereof.

There are many ways of applying landscaping material for decoration and for preserving the life of plants and trees. In FIG. 1, a landscaping system 10 is shown having a plant or tree 12 having a trunk 14 and a connected root structure 16, which is positioned beneath the ground or soil 18. A landscaping material 20 at least partially covers the soil 18 which retains the root structure 16 or the plant 12. The landscaping material 20 is applied over the soil 18 such that the material 20 at least partially surrounds the tree 12. The generally recommended depth of landscaping material 20 is about 2-4 inches. Preferably, a space is provided adjacent the trunk 14 of the tree 12 so that more air and other nutrients can enter into the ground at the center portion and so that potential harmful effects on the outside surface of the tree truck 14 are diminished. The landscaping material 20 is intended to retain moisture in the covered soil 18, for example, by preventing evaporation. The landscaping material 20 also controls weed growth by blocking sunlight to the soil 18. In addition, the landscaping material 20 insulates the soil 18, retaining warmth in cool air temperatures and cooling the soil 18 in warm temperatures.

Figure 2:
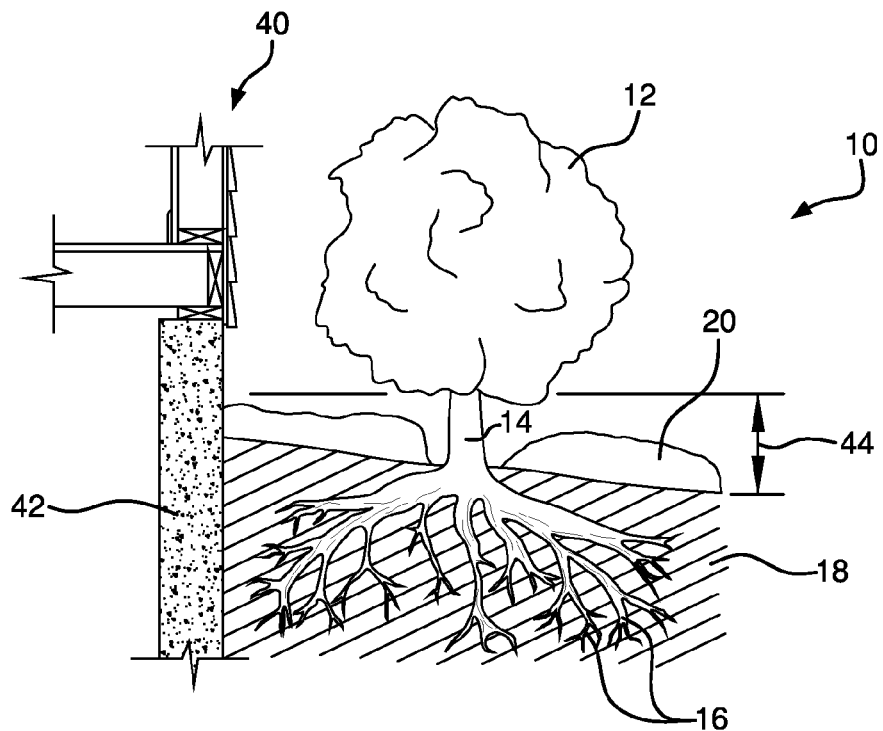
FIG. 2 is a partial cross-sectional view of a landscaping system with a tree planted adjacent a structure and with the soil surface being sloped downwardly away from the structure.

In FIG. 2 there is shown a variation of a landscaping system 10, wherein the tree 12 is positioned adjacent a structure 40, such a building and its related foundation 42. The trunk 14 of the tree 12 projects out of the soil 18, which is sloped downwardly away from the foundation 42 of the building 40. The slope 44 as shown includes the amount of drop-off from the top of the landscaping material 20 adjacent the foundation 42 and the position of the soil 18 in the front of the landscaping system 10.

Figure 3:
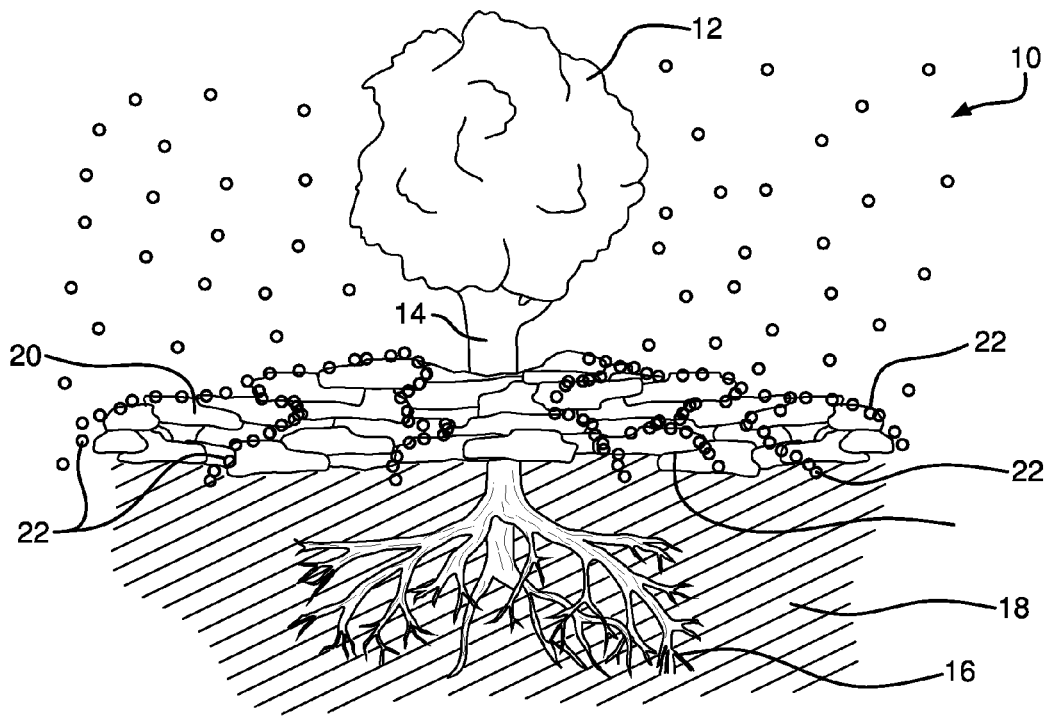
FIG. 3 is a partial cross-sectional view of a landscaping system showing a non-preferred water distribution pattern.

In FIG. 3, there is shown the landscaping system 10 with various water flow paths 22 within the landscaping material 20. Water is applied to the surface of the landscaping material 20 in the form of rain, by a watering hose or from some other source. In FIG. 3, the applied water is shown accumulating on the surface of the landscaping material and forming defined flow paths 22 over and through the material. As discussed herein, the defined flow paths 22 are result of water tending to find the path of least resistance. Because of the typical surface energy difference between water and the landscaping material, the water tends to bead up, combine with other water beads and begin to flow. As the water accumulation builds, flow streams or paths are formed. As shown, the water travels either in many different directions across the surface of the landscaping material 20 and may simply run-off the top surface, never making it to the soil 18 and the root structure 16. As also shown in FIG. 3, the water flow is randomly placed around the landscaping material 20 and tends to disproportionately apply the water to the root structure 16. This uneven distribution of water within a landscaping system 10 is not preferred.

Figure 4:
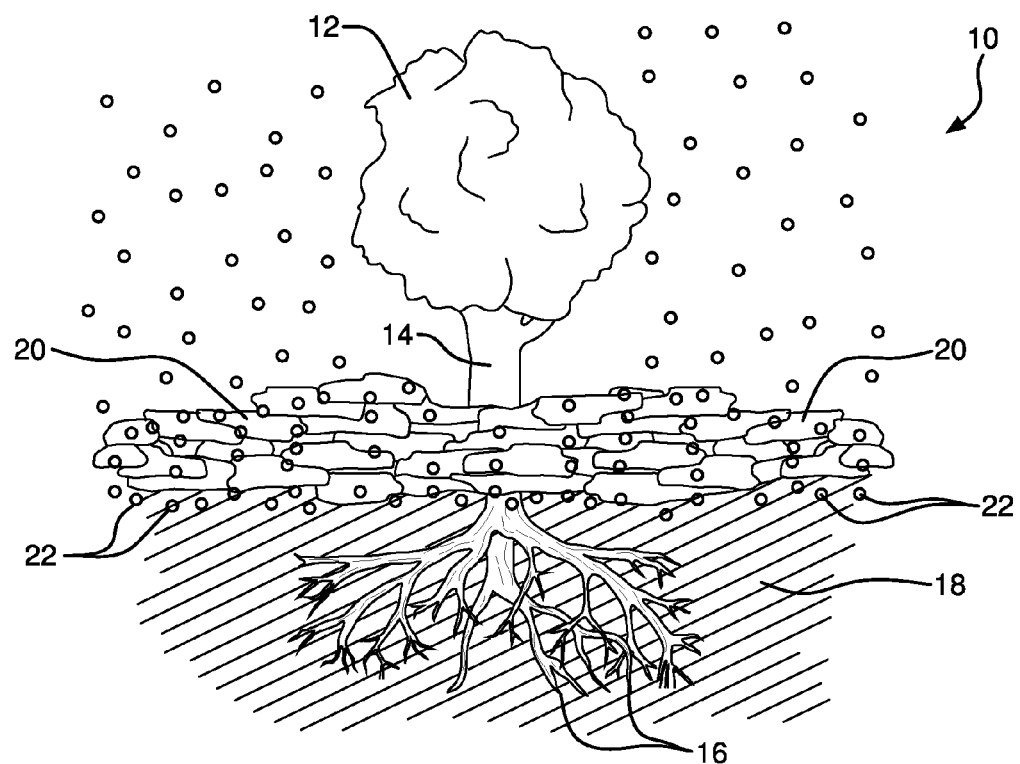
FIG. 4 is a cross-sectional view of the same landscaping system in FIG. 3 showing a preferred water distribution pattern.

The landscaping material 20 shown in FIG. 4 is shown as more uniformly directing the water flow 22 through the bed. When water 22 is applied to the surface of the landscaping material 20, it tends to spread over the bed. This spread of water serves to wet the surface of the landscaping material 20 and more deliberately move water into the underlying layers of the landscaping material 20. As landscaping material 20 spreads the water, it acts to temporarily hold water within the bed of material 20. The water 22 is then released to the soil 18 and root structure 16. As shown in FIG. 4, the water 22 tends to form a substantially uniform pattern of distribution throughout the bed of landscaping material 20'. The result illustrated is the preferred operation of a landscaping material 20 within a landscaping system.

As discussed herein, the surface tension or energy of organic materials, such as wood chips, typically used for landscaping materials is generally much less than the surface tension or energy of water. Because of this differential in surface energy, water will bead-up on the surface of the material, conglomerate and start to flow. In such cases, an uneven water distribution occurs, such as the pattern shown in FIG. 3. It is preferred that the water wet the surface of the landscaping material. In order to do this, the surface energy of the water must be lowered to be less than the surface energy of the landscaping material. The wetting process serves to temporarily hold the water and then more evenly direct the water to the soil retaining the root structure of adjacent plants and trees.

In one aspect of the present invention, a landscaping material is applied with a coating having a composition that includes a surfactant which serves as a surface tension modifier to reduce the surface energy of the water and its orientation at the air—liquid interface. As such, the contemplated coating of the present invention comprises a hybrid network of high-functionality structured oligomeric organo-polysiloxane. The coating composition further includes a polyalkylene glycol. A solvent is further provided, preferably, in the form of a co-product of monopropylene glycol and propylene oxide.

The coating composition may include or be added along with a pigmented colorant. The concentrated composition may be added to a water carrier prior to the application of the composition to the landscaping material. The composition may also include other chemicals that may assist in feeding the root structure and the plant during the useful life of the mulch, as may be known in the art.

Preferably, the composition comprises about 45% by weight siloxane, about 45% by weight of the polyalkylene glycol, and about 10% by weight of the co-product of monopropylene glycol and propylene oxide. The siloxane is preferably Dow Corning FF400 (which is also sold as Dow Corning DC-57). The polyalkylene glycol is preferably a polyether polyol and a non-ionic surfactant. It may be an ethylene oxide (EO) and propylene oxide (PO) block copolymer. The polyalkylene glycol is preferably Dow Tergitol L62 or BASF Pluronic L62. Variations in the general formulation identified above are possible. For example, siloxane weight percent in the composition may vary by plus or minus 5%. The glycol weight percent in the composition may vary by plus or minus 10%. The weight percent of the solvent component may vary by about plus or minus 2%. Other elements may also be provided in the final composition.

The siloxane has a backbone of alternating silicon and oxygen atoms. This backbone may be branched or unbranched. The siloxane may have organic side chains (i.e., a silicone). The siloxane may be polymerized (i.e., a polysiloxane). Preferably, the siloxane has organic side chains. Also, it is preferred that the siloxane be in the form of a silicone polyether (SPE) or a polyalkylene oxide-modified polydimethylsiloxane. As presently understood, the polyether chains are hydrophilic whereas the diemethyl siloxane backbone is hydrophobic. Thus, the polyether side chain has affinity for water upon rewetting during subsequent rainfall on the landscaping material through hydrogen bonding and Van der Waals forces.

The siloxane is believed to act as a non-ionic surfactant, which lowers the surface energy of water for two reasons: (i) the methyl groups on the poly(dimethylsiloxane) are second only to perfluoroalkyl groups in having the ability to provide a relatively low surface tension result, and (ii) the flexible and rotatable backbone of the siloxane bonds permits orientation of a large population of methyl groups at the surface. This flexibility also allows for reorientation for multiple cycles of water (rain fall). Once the surface energy of the water is lowered and is less than the surface energy of the landscaping material, the material will "wet out" upon the application of water. This phenomenon is called "surface tension differential flow" and occurs to minimize surface free energy. The low surface energy water (water and surfactant) flows to cover the higher surface tension-landscaping material.

The preferred Dow Corning FF-400 SPE has a surface tension ranging from about 31.9 dyne/cm to about 63 dyne/cm at 25 degrees Celsius. This composition generally has a low surface energy component compared to that of untreated organic mulch or the liquid water carrier. As such, one component of this composition including the siloxane material is to homogenize the surface energy of the landscaping material. The homogenization along with the flexible and rotatable backbone of the siloxane bonds permits orientation of a large population of methyl groups at the surface, thus lowering the water (rain) surface energy, allowing the wetting and even water distribution throughout the landscaping material As presently understood, with the landscaping material "wetted" by the water, the siloxane temporarily "holds" the water, in position through its polyether portion. The siloxane then releases the water through its hydrophobic portion. This combination provides a uniform flow of water over the landscaping material bed without significant surface run-off. In addition, the combination provides the ability to retain moisture longer (than conventional mulch colorants and coatings) and results in an appearance improvement. Consumers prefer fresh-looking mulch, which appears moist and richer in color. Preferably, however, the siloxane material does not significantly alter the look of any added colorant.

The preferred polyakylene glycol material, Tergitol L62, has a surface tension of about 41 dyne/cm at 25 degrees Celsius and is an efficient foam control agent. The glycol further serves to prevent the composition from freezing or becoming waxy in cold temperatures. It also acts as a surfactant, lowering the surface energy of the coating, allowing it to wet the landscaping material.

One purpose of the monopropylene glycol and propylene oxide co-product is to serve as a solvent that causes the siloxane and polyakylene glycol to mix and enhance freeze/thaw stability. In addition, this solvent serves to raise the overall flash point of the composition making it safer to handle. In the environment in which the coating is to be prepared, transported and applied to landscaping materials, the composition needs to be classified as non-combustible; thus, having a flashpoint greater that 200 degrees Fahrenheit (94 degrees Celsius).

Monopropylene glycol and propylene oxide co-product also aids in reducing the surface tension. As such, it lowers the surface energy of water applied to the coated landscaping material. Lowering the surface energy of water brings its surface energy closer to that of the landscaping material. This makes it more likely that water will "wet" and form a thin layer of substantially uniform thickness over the surface of the landscaping material.

There are many ways for applying the composition material to the landscaping material. Preferably, the composition is combined with a colorant before being applied. The colorant and composition are blended with water. The combination may be applied in a bulk process using an apparatus designed for adding colorant to mulch products, such as U.S. Pat. No. 6,551,401 to Winistorfer et al., which is herein incorporated by reference. The combination may also be sprayed directly onto the landscaping material already applied to a landscaping system. The amount applied may vary, depending on the form and condition of the landscaping material. For various wood species, the application rate may be from 0.12 lbs-0.30 lbs of contemplated composition per cubic yard of landscaping material. A typical colorant application would be 3.0 lbs colorant per cubic yard of landscaping material. The composition and colorant may be mixed with water at a rate of 8 gallons of water per cubic yard of landscaping material. More or less of either the composition component, colorant or water may be included depending on the desired results. For cedar, less of the coating composition may be required due to the natural oils that assist in wetting the wood.

Figure 5:
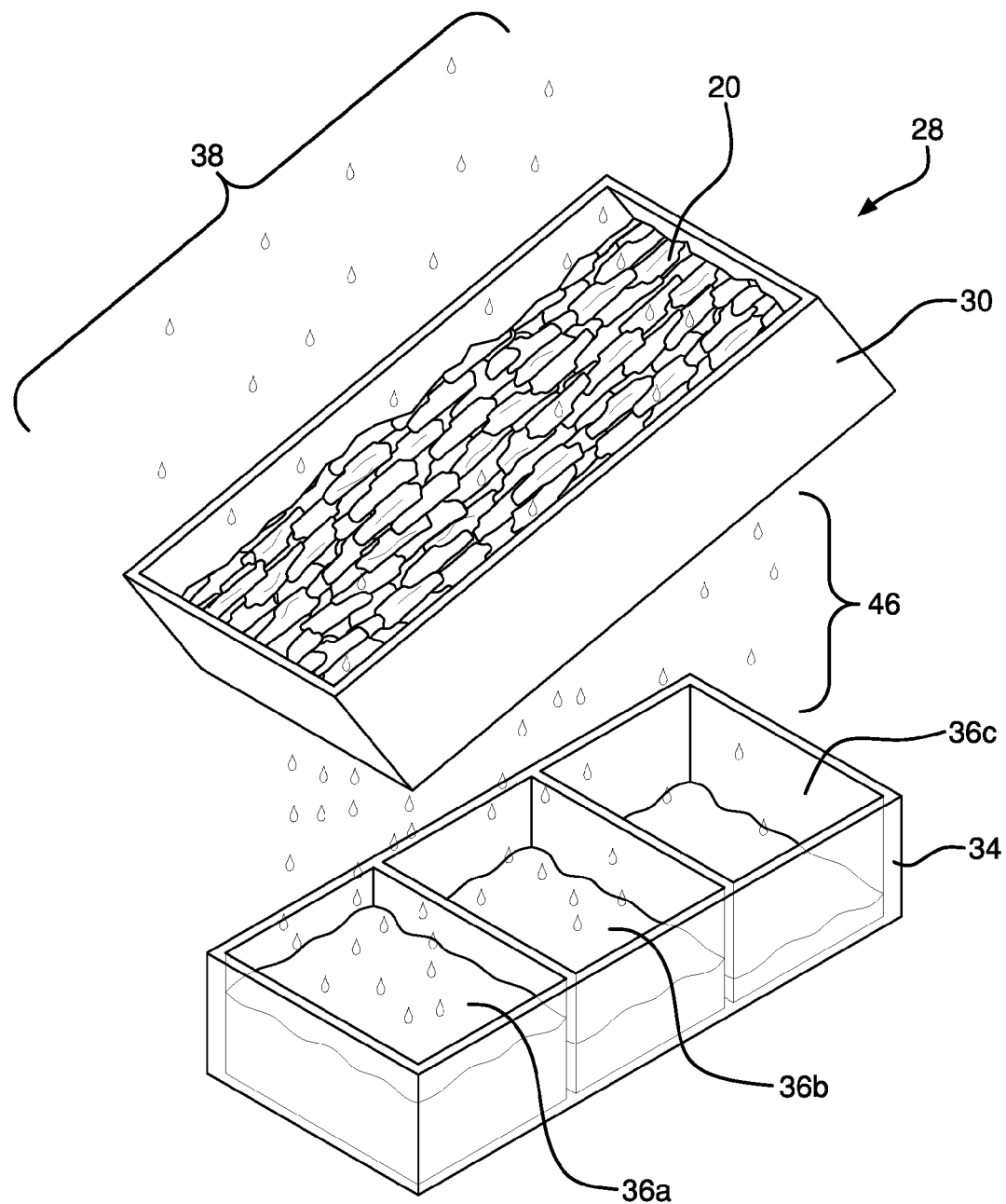
FIG. 5 is a perspective view of an apparatus for testing the effectiveness of a landscaping material.

Another aspect of the contemplated invention is the testing of the effectiveness of a landscaping material in distributing water. A testing apparatus is shown in FIGS. 5 and 6 and generally identified by the numeral 28. The apparatus 28 includes a first receptacle 30 is provided having an open top and a bottom surface having a plurality of openings 32 therein. A landscaping material 20 is filled within the first receptacle 30. Preferably, a standard layer of three inches is provided. A second receptacle 34 is positioned below and aligned with the first receptacle 30. The second receptacle 34 includes three separate compartments 36a, 36b, 36c forming three collection zones. The first receptacle 30 may be positioned parallel to the second receptacle 34 or tilted at an angle A with respect to the horizontal plane of the second receptacle 34.

The test procedure contemplates the application of a water spray 38 to upper surface of the landscaping material 20 in the first receptacle 30. As a control, the initial water content of the mulch material may be tested prior to starting the water application. The moisture content may be determined by a hydrometer probe (such as a contact probe of the type used to measure the humidity in flooring materials). Multiple readings are contemplated. To lower the moisture content, a heat lamp may be applied to the surface of the landscaping material 20, while periodically churning the material to release moisture and expose additional material to the heat lamp.

Any known means may be utilized to apply the water 38 to the landscaping material 20 within the first receptacle 30. Preferably, the water application is substantially uniform over the surface of the landscaping material 20. A contemplated water application rate is 4.6 inches/hour. A first measurement is taken to determine the time and amount of water required to saturate the landscaping material 20 in the first receptacle 30. Probing of the landscaping material layers at multiple locations and making a visual inspection of the condition of the landscaping material 20 will indicate the extent of saturation. Dry spots will essentially indicate a lack of saturation in the bed of landscaping material 20. The probing can be performed at uniform increments, such as after every application of 0.5 inches of water (approximately every 6.5 minutes at the given water application rate).

Once saturation is identified, the weight of the watered landscaping material is determined and compared to the initial weight of the material. This weight measurement indicated the amount of water added to the controlled amount of landscaping material to achieve saturation.

A collection test may also be used to evaluate the flow of water 46 passing through the bottom of the first receptacle 30 and into the compartments 36a, 36b, 36c of the second receptacle 34. As water application 38 is continued on the landscaping material 20 in the first receptacle 30, the amount of water 46 collected in each compartment 36a, 36b, 36c of the second receptacle 34 is measured. Once a designated volume of water 46 is received by one of the compartments 36a, 36b, 36c, the water application 38 is stopped. Measurements are taken as to the time, the total volume of water 38 applied to the first container 30 and the relative volume of water 46 passed through the openings 32 in the first receptacle 30 to the chambers 36a, 36b, 36c of the second receptacle 34. One completion point for the testing procedure would be the accumulation of one inch of water 46 in any one of the compartments 36a, 36b, 36c.

Two variations of the collection test are contemplated. The first collection test is a "flat test" and positions the first receptacle 30 parallel to the second receptacle 34. This flat test is to determine any variation in guidance of the water through the landscaping material 20. Because the water 38 is being applied uniformly to the surface of the landscaping material 20 in the first receptacle 30, the goal is to achieve a uniform deposit of water 46 into the three compartments 36a, 36b, 36c. Significant variation in the test results over the desired uniform distribution is an indication of channeling, similar to the type shown in FIG. 3. A uniform distribution is more closely illustrated in FIG. 4.

A second collection test is contemplated using the testing apparatus 28. In the "Run Off" test, the first receptacle 30 is placed at an angle A with respect to the horizontal second receptacle 34. Preferably the angle A is about 6 degrees, simulating the slope of the mulch and ground surface adjacent a structure (such the slope 44 shown in FIG. 2). As shown in FIG. 6, because the landscaping material 20 in the first receptacle 30 is positioned at an angle A, there is a tendency for the water 38 to move down the slope as it moves through the receptacle. Discharge of water 46 from the openings 32 in the receptacle 30 will tend to accumulate at a faster rate in the compartment 36a, which is adjacent the bottom of the slope of the receptacle 30. In this test, the time is measured for each compartment to receive 1 inch of water. As illustrated in FIG. 6, it can be expected that the first compartment 36a will fill at a greater rate than the middle compartment 36b, and that the third compartment 36c will fill at the lowest rate. Thus, the test is completed when the third compartment 36c of the lower receptacle 34 has received 1 inch of water 46 passing from the upper receptacle 30.

In determining the effectiveness of the landscaping material, and any coating thereon, the saturation test is used to measure the overall wetting of the landscaping material, including its efficiency in retaining applied water. The flat test is used to test guidance of the applied water to the landscaping material. Since the water is applied evenly on the upper surface of the landscaping material 20 in the first receptacle 30, and there are no other external forces acting on the material 20, the expected reaction of the water will be to evenly fill the compartments 36a, 36b, 36c in the receptacle 34 below. Any variation in this expected result is an indication of channeling and run-off. A more forceful indication of channeling is provided by the run-off test, where the first receptacle (and the landscaping material) is angled. The slope of the landscaping material will have an effect on the movement of water in the receptacle 30. However, various landscaping materials will react differently in controlling water flow. As discussed in more detail below, test results using the saturation test, flat test and run-off test will show that a landscaping material coated with the composition of the present invention provides much better water distribution throughout a landscaping material bed.

Landscaping material treated with the composition of the present invention was tested for its ability to retain water. Table 1 shows the results from this test. The test was run using 3 samples of mulch: (1) pine bark mulch only; (2) pine bark mulch with a red landscaping colorant; and (3) pine bark mulch with a red landscaping colorant and the coating composition of the present invention. Each sample was weighed. 2000 grams of water was applied to each sample and collected below the sample. The samples were again weighed. As shown in Table 1, The sample with the coating composition of the present invention (Sample 3) was the heaviest, indicating that the landscaping material retained more water than the other samples. Subtracting the wet weight of the sample (3) from the dry weight shows that about 310.3 grams of water were adsorbed. In addition, less water was collected in the receptacle positioned below the material sample. This also shows that the material of Sample (3) retained the most water.

TABLE 1

| Wood Sample | Flat/Filter/Mulch (g) | F/F/M after rinse (g) | Adsorbed water (g) | % Adsorbed | % moisture reading on wood | Water collected (g) | % water collected | Observed |
|---|---|---|---|---|---|---|---|---|
| 1 Pine Bark Only | 433.3 | 594.3 | 161.0 | 8.0 | 27.1 | 1804.3 | 90.2 | shed water/dry |
| 2 Pine Bark + red colorant | 428.3 | 615.3 | 187.0 | 9.3 | 30.4 | 1797.0 | 89.9 | partially wet |
| 3 Pine Bark + red colorant + coating | 431.4 | 741.7 | 310.3 | 15.5 | 41.8 | 1680.9 | 84.0 | wet throughout |

Based on the above data, landscaping material coated with the composition of the present invention conserves water because less water is required to cause saturation as opposed to conventional landscaping materials that lose more of the water applied. The amount of water conserved is directly related to how much water it takes to saturate a bed of landscaping material.

The amount of water conserved can be calculated according to the following equation:

$$\text{Water Savings (inches)} = (\text{Saturation (in.)} \times 0.33) + (\text{Guidance (in.)} \times 0.33) + (\text{Runoff (in.)} \times 0.33) \quad (1)$$

To test for water conservation and efficiency; the saturation test, flat test and run-off test as described above can be used. Various treated and untreated wood samples were tested, providing the following results:

Saturation—To measure saturation, the number of inches of water deposited on the landscaping material samples was measured. Table 2 (below) shows the average number of inches of water it took to saturate each sample of landscaping material after 4 testing runs.

TABLE 2

| | Non-treated (in.) | Treated (in.) |
|---|---|---|
| Cedar Raw | 4.8 | 2.1 |
| Pine Bark Raw | 6.5 | 3.3 |
| Hardwood Oak Raw | 3.5 | 1.4 |
| Cedar with red colorant | 7.6 | 1.2 |
| Pine Bark with red colorant | 2.8 | 1 |
| Hardwood Oak with red colorant | 2.2 | 0.6 |
| Average | 4.6 | 1.6 |

The test results shows that wood landscaping materials treated with the composition of the present invention becomes saturated more quickly with about 65% less water on average across all wood species tested. The color treated materials also became saturated more quickly than non-treated, raw wood material. More water was required in order to saturate the cedar material because it has a lower surface energy than oak or pine bark.

Guidance—To measure guidance, water was deposited onto the dry landscaping materials in the flat test, as described above. The holding receptacle for the landscaping material is disposed substantially horizontally, with the water passing through the samples being collected in the compartments of the collection receptacle. The height of the water in each compartment is measured in each collection receptacle after each run. To determine guidance, the highest water level measured (in inches) in the compartments is subtracted from the lowest water level measured. This calculation determines how well the landscaping material distributes the water throughout the bed. The data obtained is shown in Table 3.

TABLE 3

| | Non-treated (in.) | Treated (in.) |
|---|---|---|
| Cedar Raw | 0.6 | 0.3 |
| Pine Bark Raw | 1.1 | 0.4 |
| Hardwood Oak Raw | 0.7 | 0.05 |
| Cedar with red colorant | 0.9 | 0.1 |
| Pine Bark with red colorant | 0.6 | 0.1 |
| Hardwood Oak with red colorant | 0.7 | 0.1 |
| Average | 0.8 | 0.2 |

The data shows that wood material coated with the composition of the present invention distributed water more effectively. There was less differential between the highest and lowest water level as compared to the raw and colored (without the coating) materials.

Run-off—To measure runoff, each of the wood materials was tested using the angled receptacle positioned at about 6 degrees with respect to a horizontal plane. Water is deposited at a one inch interval onto a dry material bed. The amount of water run-off into the lower receptacle is then measured. It is preferred that more water be retained in the landscaping material and, thus, a lesser amount of run-off occur. The run-off test results for the various materials are shown in Table 4:

TABLE 4

| | Non-treated (in.) | Treated (in.) |
|---|---|---|
| Cedar Raw | 0.81 | 0.35 |
| Pine Bark Raw | 0.76 | 0.36 |
| Hardwood Oak Raw | 0.76 | 0.45 |
| Cedar with red colorant | 0.82 | 0.08 |
| Pine Bark with red colorant | 0.41 | 0.38 |
| Hardwood Oak with red colorant | 0.41 | 0.35 |
| Average | 0.66 | 0.33 |

The run-off data shows that mulch coated with the composition of the present invention had less runoff on average across all three wood species tested. Colored materials also experienced less runoff than non-colored (raw) material, with the exception of cedar. Raw cedar has more runoff than hardwood oak and pine bark red. Cedar coated with the composition of the present invention experienced less runoff than colored hardwood oak and pine bark.

Water Savings can be calculated using the following equations:

$$\text{Water Savings (inches)} = (\text{Saturation (in.)} \times 0.33) + \\ (\text{Guidance (in.)} \times 0.33) + (\text{Runoff (in.)} \times 0.33) \quad (2)$$

$$\% \text{ Water Savings} = \\ [(\text{water savings of non-treated} - \text{water savings of treated})/ \\ (\text{water savings of non-treated})] \times 100 \quad (3)$$

The calculated data for the various tests is provided in Table 5.

TABLE 5

|  | Non-treated (in.) | Treated (in.) |
| --- | --- | --- |
| Cedar Raw | 2 | 0.9 |
| Pine Bark Raw | 2.8 | 1.3 |
| Hardwood Oak Raw | 1.6 | 0.6 |
| Cedar with red colorant | 3.1 | 0.5 |
| Pine Bark with red colorant | 1.3 | 0.5 |
| Hardwood Oak with red colorant | 1.1 | 0.3 |
| Average | 1.98 | 0.68 |

The data shows that every species of mulch that is coated with the composition of the present invention has an average water savings of about 66% (using equation (3) above). Cedar has the greatest water savings at 72% followed by hardwood oak at 67% and pine bark at 56%.

In addition to the above comparisons of landscaping materials and coatings, the efficiency of the landscaping material can be calculated, using the total watering time (in seconds) to complete the saturation and guidance tests. The efficiency calculation uses the following formula:

$$E_{TIME} = 1 - (\text{Time}_{NEW}/\text{Time}_{CONTROL}) \quad (4)$$

As discussed above, four runs were used to determine saturation and guidance. The average time to complete these four runs for each wood material is shown in Table 6 (below).

TABLE 6

|  | Non-treated (sec.) | Treated (sec.) |
| --- | --- | --- |
| Cedar Raw | 6615 | 3675 |
| Pine Bark Raw | 7650 | 3930 |
| Hardwood Oak Raw | 4155 | 2355 |
| Cedar with red colorant | 8430 | 2205 |
| Pine Bark with red colorant | 3810 | 1890 |
| Hardwood Oak with red colorant | 3375 | 1530 |
| Average | 5673 | 2598 |

The percent efficiency of each landscaping material is shown in Table 7.

TABLE 7

|  | Efficiency (%) |
| --- | --- |
| Cedar Raw | 44 |
| Pine Bark Raw | 49 |
| Hardwood oak Raw | 43 |
| Cedar with red colorant | 74 |
| Pine Bark with red colorant | 50 |
| Hardwood Oak with red colorant | 55 |
| Average | 53 |

The data shows that wood landscaping materials coated with the composition of the present invention is about 53% more efficient, on average, than the untreated samples. Cedar is the most efficient at about 59%, followed by Pine Bark with the red colorant at about 50% efficient, followed by hard wood oak at about 49% efficient. The materials with colorant added are more efficient as compared to the raw wood landscaping materials.

As can been seen from the testing results reported herein, the coating composition of the present invention add significantly to the effectiveness of typical landscaping materials, whether they be in a raw condition or with colorant added. These results were evaluated using the contemplated testing apparatus and testing methods. Although the invention has been described and illustrated with respect to exemplary embodiments, it should be understood by those skilled in the art from the foregoing that various other changes, omissions and additions may be made therein and thereto, without parting from the spirit and scope of the present invention.

What is claimed is:

1. A composition for treating landscaping material comprising:
   about 45% by weight siloxane; and
   about 45% by weight polyalkylene glycol.

2. The composition of claim 1, wherein the siloxane is a polysiloxane comprising at least one organic group.

3. The composition of claim 1, wherein the siloxane is oligomeric.

4. The composition of claim 1, wherein the siloxane has a surface tension ranging from about 32.00 dyne/cm to about 63.00 dyne/cm.

5. The composition of claim 1, wherein the siloxane is comprised of a silicone polyether.

6. The composition of claim 5, wherein the siloxane is a polyalkylene oxide-modified polydimethylsiloxane.

7. The composition of claim 1, further comprising a water-based carrier.

8. The composition of claim 7, wherein the carrier further comprises a colorant.

9. The composition of claim 1, wherein the landscaping material is a plurality of chips of a fibrous organic material.

10. A coating for treating a landscaping material, the coating comprising:
    a composition comprising
      at least one siloxane;
      at least one polyalkylene glycol; and
      a carrier,
    wherein the composition comprises about 45% by weight siloxane, about 45% by weight of the polyalkylene glycol, and wherein the carrier is water-based.

11. The coating for a landscaping material as in claim 10, wherein the at least one siloxane is comprised of a silicone polyether.

12. The coating for a landscaping material as in claim 10, wherein the at least one siloxane is a polysiloxane comprising at least one organic group.

13. The coating for a landscaping material as in claim 10, wherein the siloxane is oligomeric.

14. The coating for a landscaping material as in claim 10, wherein the siloxane has a surface tension ranging from about 32.00 dyne/cm to about 63.00 dyne/cm.

15. The coating for a landscaping material as in claim 11, wherein the siloxane is a polyalkylene oxide-modified polydimethylsiloxane.

16. The coating for a landscaping material as in claim 10, wherein the carrier further comprises a colorant.

* * * * *